United States Patent [19]

Onoe et al.

[11] Patent Number: 4,790,802

[45] Date of Patent: Dec. 13, 1988

[54] POWER TRANSMISSION BELT

[75] Inventors: Susumu Onoe, Osaka; Mutsuyuki Yamaguchi, Izumisano, both of Japan

[73] Assignee: Bando Chemical Industries, Ltd., Hyogo, Japan

[21] Appl. No.: 97,287

[22] Filed: Sep. 11, 1987

Related U.S. Application Data

[63] Continuation of Ser. No. 819,769, Jan. 17, 1986, abandoned.

[30] Foreign Application Priority Data

Jan. 18, 1985 [JP] Japan .................................. 60-7839

[51] Int. Cl.$^4$ ........................... F16G 1/10; F16G 5/08
[52] U.S. Cl. ..................................... 474/260; 57/204; 57/902
[58] Field of Search ................. 474/260, 263; 57/902, 57/201, 204

[56] References Cited

U.S. PATENT DOCUMENTS

| | | | |
|---|---|---|---|
| B 419,059 | 12/1968 | Bridge, Jr. | 57/902 |
| 3,826,298 | 7/1974 | Tanaka et al. | 57/902 |
| 4,083,260 | 4/1978 | Carlson | 474/260 |

FOREIGN PATENT DOCUMENTS

| | | |
|---|---|---|
| 105135 | 8/1981 | Japan . |
| 19744 | 2/1984 | Japan . |

Primary Examiner—Stephen J. Novosad
Assistant Examiner—Bruce M. Kisliuk
Attorney, Agent, or Firm—Armstrong, Nikaido, Marmelstein & Kubovcik

[57] ABSTRACT

A power transmission belt having a load carrier in which a twisted cord of synthetic fiber such as polyester fiber or of inorganic fiber such as glass fiber is embedded. Said load carrier is made by final twisting a plurality of twisted yarn (one or plural single yarns first twisted) in the direction contrary to the first twisting direction. The first twisting angle should be in the range between 87° and 93° and the final twist multiplier should preferably be in the range between 400 and 1,600.

14 Claims, 6 Drawing Sheets

POWER TRANSMISSION BELT

This application is a continuation of application Ser. No. 819,769 filed Jan. 17, 1986, now abandoned.

BACKGROUND OF THE INVENTION

Field of the Invention

This invention relates to a power transmission belt using twisted cords of synthetic fiber or inorganic fiber as load-carriers.

Description of the Prior Art

With the recent trend to fuel expenses saving and higher efficiency in the automobile field, it has been required that the power transmission belt to be used for automobiles stands the use under severe conditions, for example, the V-ribbed belt to be used as a fan belt of motor car must be usable under the high speed condition (for example, at around 60 m/second).

Under such high speed condition, however, the belt oscillates in width direction about 30–60 mm and if such oscillation continues for many hours, the following troubles are liable to occur.

(i) Generation of abnormal sound due to oscillation.
(ii) Extraordinary wear of belt due to pulley.
(iii) Belt slip attributable to the decrease in tension originating from the wear of belt.
(iv) Degradation of rubber caused by abnormally high temperature due to slip.
(v) Coming off of projecting parts of belt.

As measures to cope with such oscillation of belt, various methods have been known, for example, (i) To change the direction of warp of upper canvas.
(ii) To embed load-carrying cords of S-twist and those of Z-twist alternately.
(iii) To lessen winding pitch and winding angle of load carrier.

However, from the method (i) fully satisfactory result cannot be obtained. In the method (ii) load-carrying cords of different twisting direction must be manufactured. In this case, since load-carrying cords of S-twist and those of Z-twist turn in reverse direction with each other at molding of a belt, a belt of disordered cord winding pitch is produced and such belt is short in service life. In the method (iii) load-carrying cords are closer to each other and consequently adhesiveness of them is reduced considerably. Although such trouble can be eliminated by reducing the diameter of each load-carrier, the desired tensile strength of a belt as a whole cannot be obtained from load carriers of smaller diameter.

After ardent studies, the inventors have found that the first twist multiplier and especially the angle of final twist affect the oscillation of a running belt to a large extent and such findings have led them to develop the present invention.

U.S. Pat. No. 4,083,260 discloses an endless power transmission belt comprising a tension section, a compression section and a load-carrying section between the foregoing two sections, wherein such load-carrying section has a twisted, helically wound load-carrying cord disposed therein which is defined in terms of twist multiplier having a numerical value in the range of between 4–8 in the equation $TM = td^{\frac{1}{2}}/K$ (where TM is the twist multiplier, t is the number of twists of the cord expressed in terms of the number of twists per inch, d is denier of the cord, and K is constant for the particular material used to define the cord). Japanese Patent Application Publication No. 56-105135 discloses a power transmission belt having load carriers which are fraying-free twisted cords of aramid fiber having the twist multiplier of 3–9, Japanese Patent Application Publication No. 59-19744 teaches a power transmission belt having load carriers of improved fatigue resistance which are twisted cords of glass fiber made by final twisting a plurality of glass fiber strand which were first twisted in the same direction as final twisting, with the final twist multiplier of 0.60–1.50 and the first twist multiplier which is $\frac{1}{4}$–$\frac{1}{2}$ of the final twist multiplier. None of these belts, however, is sufficient in preventing oscillation of a belt in its width direction.

SUMMARY OF THE INVENTION

An object of the present invention is to provide a power transmission belt which is free from oscillation in belt width direction under high speed condition, less in oscillating sound, less in belt wear, less in lowering of tension and longer in service life.

The present invention is an improvement on the power transmission belt which uses twisted cords of synthetic fiber or inorganic fiber, such as glass fiber, as a load carrier. Such load carrier is characterized in that it is made by final twisting a plurality of twisted yarn (one or plural strands of single yarn first twisted) in the direction contrary to the first twisting direction. By making the first twisting angle 87°–93°, first twisting direction is substantially conformed to the length wise direction of a load carrier.

Preferably, the final twist multiplier of a load carrier should be within the range of between 400 and 1,600.

The above-mentioned and other objects and novel features of the present invention will become more apparent by reading the following description of the present invention, with reference to the accompanying drawings.

BRIEF DESCRIPTION OF THE DRAWINGS

The accompanying drawings show a preferred embodiment of the present invention, in which.

DETAILED DESCRIPTION OF THE INVENTION

A preferred embodiment of the present invention is described below, with reference to accompanying drawings.

Figure 1:
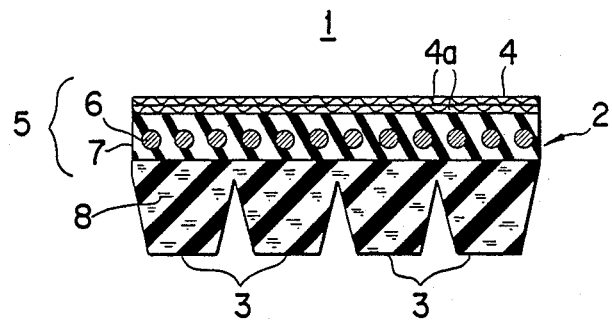
FIG. 1 is a longitudinal section of a V-ribbed belt which is an example of the power transmission belt.

In FIG. 1, numeral 1 denotes a V-ribbed belt (fan belt) power transmission belt, with a plurality of ribs 3 made extending over the whole circumference of belt on a belt phase 2. Numeral 4 is an upper canvas layer comprising two cotton canvases 4a, 4a. Numeral 5 is a load-carrying layer provided in the belt base 2. It comprises a chloroprene rubber 7 as adhesive rubber and a load carrier 6 composed of twisted cords of polyester fiber. Numeral 8 is a compressed rubber layer comprising a chloroprene rubber containing short staple fibers, a part of which is formed in ribs 3.

Figure 2:
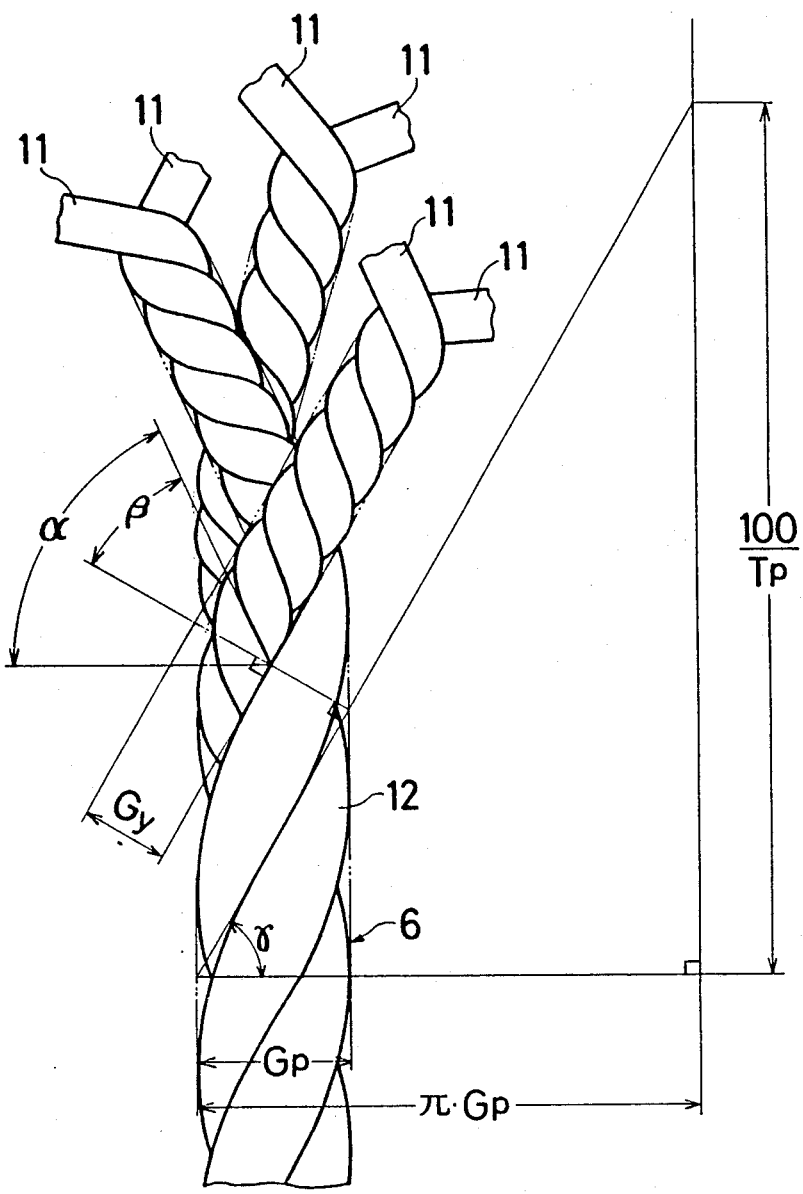
FIG. 2 is an explanatory drawing of the first twisting angle of a load carrier.

The load carrier 6 as shown in FIG. 2 is composed of 1,100D/2×3 which is made by final twisting tree strands of twisted yarn 12 (two 1,100d single yarn 11 first twisted in a first direction to form strand 12) in the direction counter to the first twisting direction. It has the final twist multiplier of 400–1,600 and is 87°–93° in the first twisting angle $\alpha$.

As the twist multiplier K is obtained from the following equation $$K = T \cdot \sqrt{D}$$

where
T: Number of twists/10 cm
D: denier,
the final twist multiplier Kp is calculated on the basis of the following equation $$Kp = Tp \cdot \sqrt{D}$$

where Tp: Number of final twist (number of twists/10 cm).

The first twisting angle $\alpha$ is a twisting angle of a single yarn 11 at the surface where the single yarn crosses at right angle with an axial line of the load carrier 6 and is calculated on the basis of the following equation $$\alpha = \beta + (90° - \gamma) \quad \text{(refer to FIG. 2)}.$$

The angle $\gamma$ which is the twisting angle of twisted yarn 12 at the surface where the twisted yarn crosses at right angle with the axial line of the load carrier is calculated on the basis of the following equation $$\tan \gamma = (100/Tp)/\pi \cdot Gp$$

where Gp: Diameter of load carrier 6 (mm).

This is because $\pi \cdot Gp$ is the circumferential length of the load carrier 6 and $100/Tp$ is the twisting length per round (one twist).

Similarly, the twisting angle $\beta$ of single yarn at the surface where the single yarn crosses at a right angle with the axial line of twisted yarn 12 is calculated on the basis of the following equation $$\tan \beta = (100/Tr)/\pi \cdot Gy$$

where
Tr: Number of first twist (number of twist/10 cm)
Gy: Diameter of twisted yarn 12 (mm)

As material for forming the load carrier, inorganic fiber such as glass fiber is used, besides synthetic fiber such as polyester fiber, nylon fiber, aramid fiber, etc.

Figure 3:
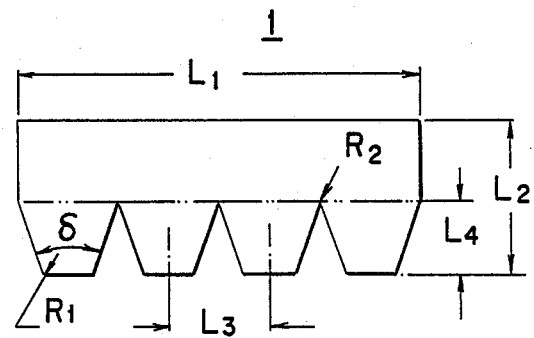
FIG. 3 is an explanatory drawing of the measurements of the belt.

An explanation is made below about the test carried out on the belt mentioned above. The measurements of the belt are as shown in FIG. 3, namely, $\delta = 40$ degree, $L_1 = 14.2$ mm, $L_2 = 5.8$ mm, $L_3 = 3.6$ mm, $L_4 = 2.9$ mm, $R_1 = 0.3$ mm, and $R_2 = 0.24$ mm.

Figure 4:
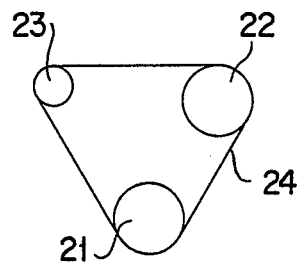
FIG. 4 and FIG. 5 are respectively an explanatory drawing of the testing system.

The test on oscillation of a running belt was carried out by the system shown in FIG. 4, namely, a sample belt 24 was wound round a driving pulley 21 (150 mm in diameter) and a pair of driven pulleys 22, 23 (140 mm and 80 mm in diameter respectively), oscillation of the belt in belt width direction at between the driven pulleys 22, 23 was photographed by a high-speed camera and read the maximum oscillating width, which was determined as the oscillation of the belt.

Figure 5:
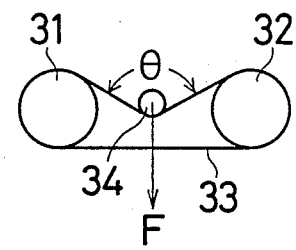

The test on flex fatigue of a running belt was carried out by the system shown by FIG. 5, namely, a sample belt 33 was wound round between a driving pulley 31 (150 mm in diameter) and a driven pulley 32 (140 mm in diameter), a load of F = 15 Kg was applied to the outer surface of the central part of the belt between the two pulleys 31, 32 by using an idler pulley 34 (40 mm in diameter), the sample belt was run continuously for 24 hours at 1,800 r.p.m. revolution and 3 PS load of engine, a load carrier (cord) was taken out of the sample belt 33 and a cord strength of the load carrier at the central part of the belt was measured as the strength after flex fatigue.

Figure 6:
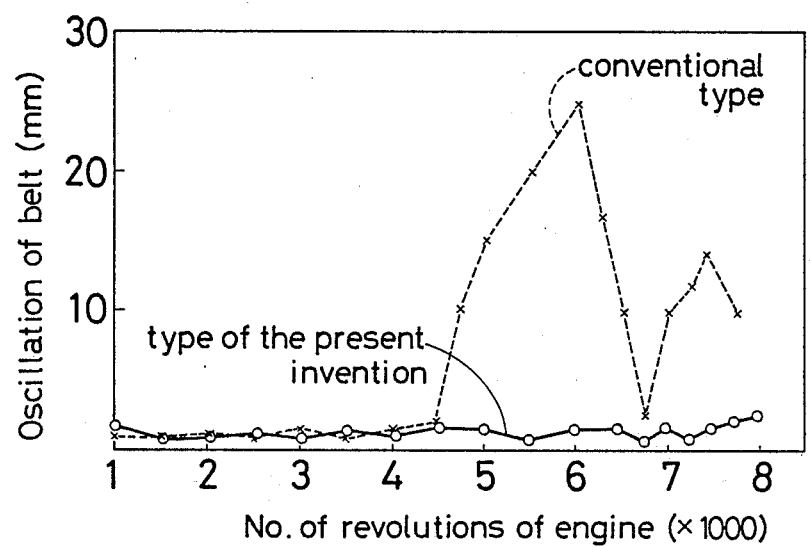
FIG. 6 to FIG. 9 are respectively an explanatory drawing of the test result.

1. Relation between the r.p.m. of engine and the oscillation of belt:

The result of the test is as shown by FIG. 6, from which it can be seen that while the conventional belt shows an abrupt increase of oscillation at the engine revolution of 4,500 r.p.m. and higher, the belt according to the present invention shows only slight oscillation, irrespective of r.p.m. of the engine.

Characteristics of the load carrier according to the present invention, as compared with the conventional load carrier, are as shown in the following table.

|  | Load carrier according to the present invention | Conventional load carrier |
| --- | --- | --- |
| Construction of cord | 1,100 D/2 × 3 | 1,100 D/2 × 3 |
| Tp | 10 | 10 |
| Tr | 17.3 | 23.7 |
| Kp | 812 | 812 |
| $\alpha$ | 90 | 84 |

Figure 7:
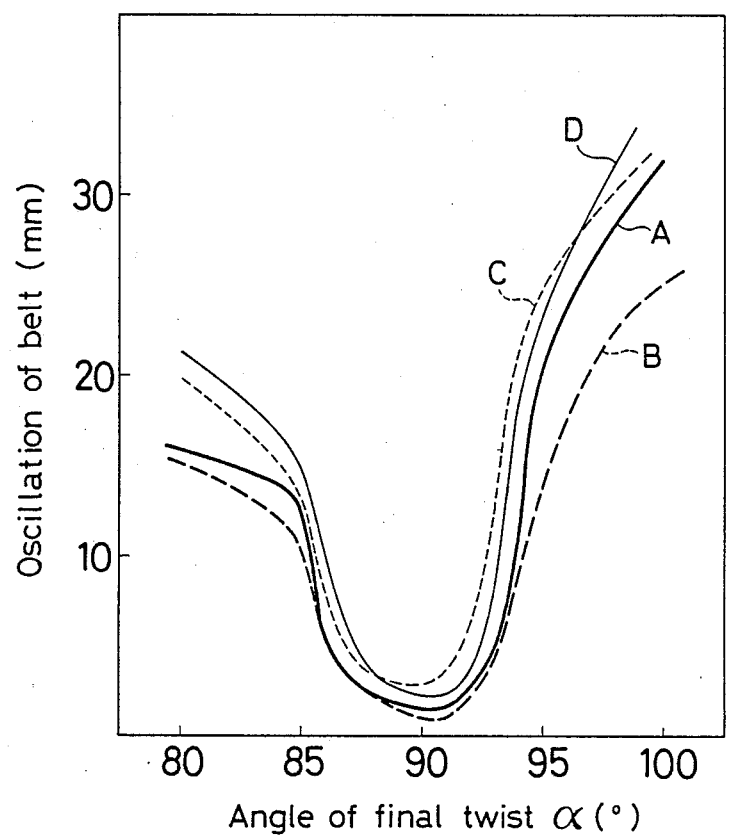

2. Relation between the final twisting angle and the oscillation of belt:

The result of the test is as shown by FIG. 7, from which it can be seen that in the case of synthetic fiber such as polyester fiber, nylon fiber, polyaramid fiber, etc., and inorganic fiber such as glass fiber, oscillation of belt is small in the range of between 87° and 93°.

The load carrier is made by final twisting 13 strands of twisted yarn (three strands of single yarn first twisted) in the direction contrary to the first twisting direction. The above twisted yarn is 1,100D/2×3 in the case of polyester fiber A, 840D/2×3 in the case of nylon fiber B, 1,500/2×3 in the case of aramid fiber C and ECG34 (33.7 g/1,000 m) in the case of glass fiber. The number of final twisting Tp = 10 and the engine revolution = 7,500 r.p.m. In the case of synthetic fiber, its fineness is expressed in terms of denier (number of grams per 9,000 m) but in the case of glass fiber, its fineness is expressed in terms of the number of grams per 1,000 m and therefore the final twist multiplier is calculated on the basis of fineness converted to denier (increased by 9 times), namely, ECG34-3/13 is converted to about 11830 denier (33.7×3×13 = 1314.3×9 = 11828.7).

Figure 8:
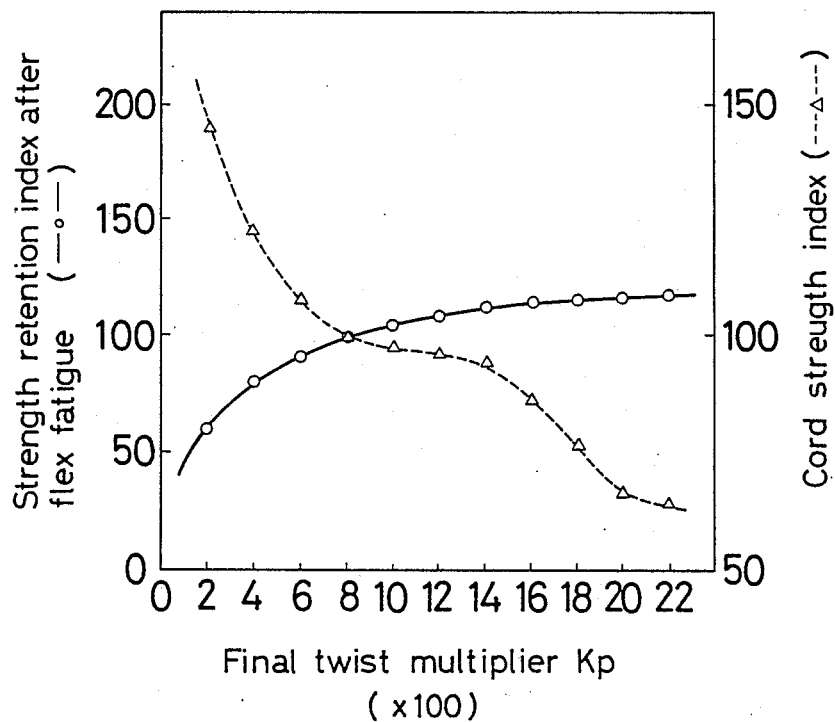

3. Relation between the final twist multiplier and the cord strength/flex fatigue:

The result of the test is as shown by FIG. 8, which indicates that flex fatigue lowers when the final twist multiplier Kp is less than 400 and the cord strength lowers extremely when the final twist multiplier Kp is more than 1,600. It is therefore desirable that the final twist multiplier is in the range of between 400 and 1,600. The load carrier is made of polyester fiber and the first twisting angle is 90° as in the case of item 1. In FIG. 8, the index is expressed by taking the cord strength and the strength retention after flex fatigue in the case where the final twist multiplier is 800 as 100 respectively.

Figure 9:
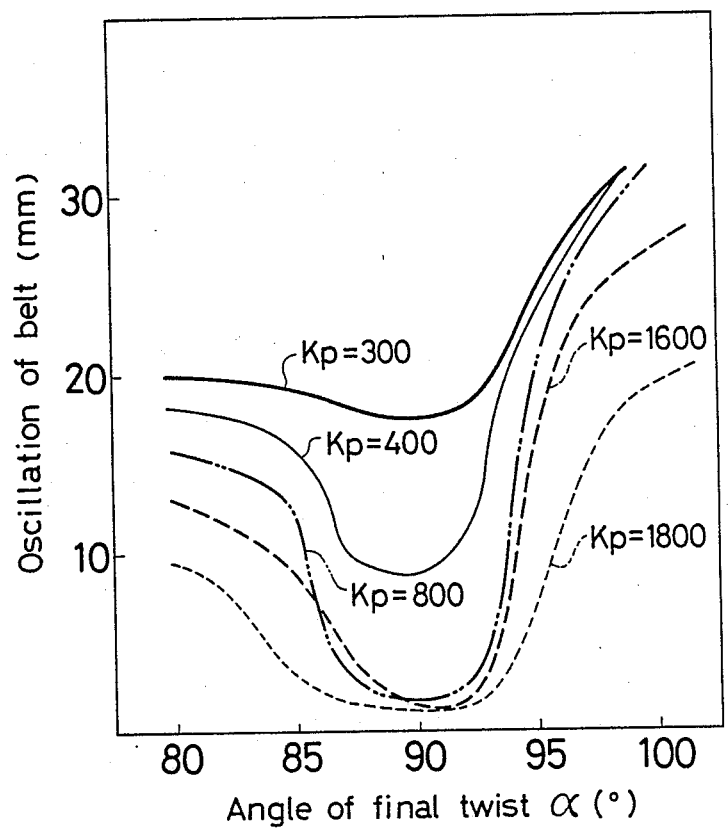

4. Relation between the final twist multiplier/first twisting angle and the oscillation of belt:

The result of the test is as shown by FIG. 9, which indicates that the oscillation of belt is especially small when the first twisting angle is in the range of between 87° and 93° and the final twist multiplier is in the range of between 400 and 1,600. In the case where the final twist multiplier is 1,800, too, good result is shown for the oscillation of belt but as is obvious from FIG. 8, cord strength is low in this case. The load carrier is made of polyester fiber and the engine revolution is 7,500 r.p.m.

In the above embodiment, an explanation was made about an example in which the present invention was applied to a V-ribbed belt but the present invention is also applicable to a wrapped V belt, a low edge type belt, a toothed belt, a cogged V belt, a conveyor belt and the like.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A power transmission belt having a load carrier twisted cord embedded therein said load carrier twisted cord having a plurality of yarns selected from the group consisting of synthetic fiber yarns and inorganic fiber yarns and twisted together to form said load carrier twisted cord, said plurality of yarns, before final twist into said load carrier twisted cord, having each been first twisted, in the direction opposite to said final twist of said load carrier twisted cord, so that a first twist angle at which each yarn of said plurality of yarns crosses with a surface at right angle to the axial line of said load carrier twisted cord is between 87° to 93°.

2. A power transmission belt as set forth in claim 1, wherein said load carrier is a twisted cord of polyester fiber.

3. A power transmission belt as set forth in claim 1, wherein said load carrier is a twisted cord of nylon fiber.

4. A power transmission belt as set forth in claim 1, wherein said load carrier is a twisted cord of aramid fiber.

5. A power transmission belt as set forth in claim 1, wherein said load carrier is a twisted cord of glass fiber.

6. A power transmission belt as set forth in claim 1 in which said first twist angle is defined as $\alpha = \beta + (90° - \gamma)$ where:

$\alpha$ is the first twist angle of a single yarn which such single yarn crosses with a surface at right angle with the axial line of said load carrier; $\beta$ is a twist angle of a single yard which such single yarn crosses with a surface at right angle with the axial line of the twisted yarn calculated on the following basis $$\tan\cdot\beta = (100/Tr)/\pi\cdot Gy$$

where $Tr$ = the number of first twists/10 cm, and $Gy$ = diameter of the twisted yarn; and $\gamma$ is the final twist angle of the twisted yarn which such twisted yarn crosses with a surface at right angle with the axial line of the load carrier calculated on the following basis:

$$\tan\cdot\gamma = (100/Tp)/\pi\cdot GP$$

where $Tp$ = the number of the final twists/10 cm and $Gp$ = diameter of the load carrier.

7. A power transmission belt having a load carrier twisted cord embedded therein said load carrier twisted cord having a plurality of yarns selected from the group consisting of synthetic fiber yarns and inorganic fiber yarns and twisted together to form said load carrier twisted cord, said plurality of yarns, before final twist into said load carrier twisted cord, having each been first twisted, in the direction opposite to said final twist of said load carrier twisted cord, so that a first twist angle at which each yarn of said plurality of yarns crosses with a surface at right angle to the axial line of said load carrier twisted cord having a final twist multiplier between 400 and 1,600 as calculated by multiplying the number of final twists in said load carrier twisted cord by the square root of the denier of said load carrier twisted cord.

8. A power transmission belt as set forth in claim 7, wherein said load carrier is a twisted cord of polyester fiber.

9. A power transmission belt as set forth in claim 8, wherein a plurality of ribs are made on a belt base along the lengthwise direction of belt and the load carrier is embedded in said belt base.

10. A power transmission belt as set forth in claim 9, which is a fan belt for automobiles.

11. A power transmission belt as set forth in claim 7, wherein said load carrier is a twisted cord of nylon fiber.

12. A power transmission belt as set forth in claim 7, wherein said load carrier is a twisted cord of aramid fiber.

13. A power transmission belt as set forth in claim 7, wherein said load carrier is a twisted cord of glass fiber.

14. A power transmission belt as set forth in claim 7 in which said first twist angle is defined as $\alpha = \beta + (90° - \gamma)$ where:

$\alpha$ is the first twist angle of a single yarn which such single yarn crosses with a surface at right angle with the axial line of said load carrier; $\beta$ is a twist angle of a single yarn which such single yarn crosses with a surface at right angle with the axial line of the twisted yarn calculated on the following basis $$\tan\cdot\beta = (100/Tr)/\pi\cdot Gy$$

where $Tr$ = the number of first/10 cm, and $Gy$ = diameter of the twisted yarn; and $\gamma$ is the final twist angle of the twisted yarn which such twisted yarn crosses with a surface at the right angle with the axial line of the load carrier calculated on the following basis $$\tan\cdot\gamma = (100/Tp)/\pi\cdot Gp$$

where $Tp$ = the number of final twists/10 cm and $Gp$ = diameter of the load carrier.

* * * * *